United States Patent [19]

Minami et al.

[11] Patent Number: 4,898,788
[45] Date of Patent: Feb. 6, 1990

[54] DECORATIVE LAMINATED SHEET AND DECORATIVE OVERLAID PLYWOOD FACED WITH THERMOSETTING RESIN

[75] Inventors: Kenji Minami, Suita; Hidetaka Yatagai, Nishinomiya; Yoshinori Sano, Kobe, all of Japan

[73] Assignee: Nippon Shokubai Kagaku Kogyo Co., Ltd., Osaka, Japan

[21] Appl. No.: 221,208

[22] Filed: Jul. 19, 1988

[30] Foreign Application Priority Data

Jul. 21, 1987 [JP] Japan .................................. 62-179953

[51] Int. Cl.$^4$ ..................... B32B 27/10; B32B 27/36
[52] U.S. Cl. ................................. 428/481; 428/526; 428/528; 428/530; 427/325; 427/326; 427/395; 427/397
[58] Field of Search ................. 428/481, 528, 530, 526

[56] References Cited

U.S. PATENT DOCUMENTS 2,761,779  9/1956  Lindenfelser et al. .
2,859,188  11/1958  Helder et al. .
3,379,661  4/1968  Glynn et al. ........................ 260/17.3

FOREIGN PATENT DOCUMENTS

48-11756  5/1973  Japan .
9096086  9/1974  Japan .................................. 428/481
0067460  5/1980  Japan .................................. 428/481
1221976  2/1971  United Kingdom .

Primary Examiner—P. C. Ives
Attorney, Agent, or Firm—Burns, Doane, Swecker & Mathis

[57] ABSTRACT

A thermosetting resin decorative laminated sheet faced with a resin-impregnated sheet layer obtained by impregnating a sheetlike material with a resin composition containing an amino resin (I) produced by the reaction of formaldehyde with an amino compound (A) having as an essential component thereof at least one carboguanamine (a) selected from the group consisting of cyclohexanecarboguanamine and norbornanecarboguanamine and curing the resultant impregnated sheetlike material excels in flexibility, crack resistance, light resistance, and chemical resistance. A decorative overlaid plywood enjoying similarly desirable properties is obtained by integrating the aforementioned sheet layer with a substrate.

22 Claims, 2 Drawing Sheets

DECORATIVE LAMINATED SHEET AND DECORATIVE OVERLAID PLYWOOD FACED WITH THERMOSETTING RESIN

BACKGROUND OF THE INVENTION

1. Field of the Invention

This invention relates to a decorative laminated sheet possessing high surface hardness and excelling in gloss, flexibility, light resistance, stain resistance, water resistance, chemical resistance, and crack resistance and to a decorative overlaid plywood excelling in surface hardness, gloss, light resistance, stain resistance, water resistance, chemical resistance, and crack resistance.

2. Description of the Prior Art

Among the decorative laminated sheets and decorative overlaid plywoods heretofore known to the art are counted such thermoplastic resin decorative laminated sheets and decorative overlaid plywoods which are obtained by coloring or printing patterns on polyvinyl chloride resin films or polyester films and pasting these films on plywoods and hardboards. The thermosetting resin decorative laminated sheets produced by the method which comprises impregnating colored or pattern-printed sheets of paper or cloth severally with melamine resin, benzoguanamine resin, phenol resin, unsaturated polyester resin, etc. or with copolycondensation products of such resins and, at the same time, curing the impregnated sheets and the thermosetting resin decorative overlaid plywoods produced by the method which comprises preparing the same impregnated sheets of paper or cloth and curing these sheets integrally with substrates are also counted among the conventional decorative laminated sheets and decorative overlaid plywoods mentioned above. Of these decorative laminated sheets and decorative overlaid plywoods, the thermoplastic resin decorative laminated sheets and decorative overlaid plywoods possess highly desirable flexibility and enjoy rich freedom of fabrication but are deficient in surface hardness, heat resistance, and chemical resistance. The thermosetting decorative laminated sheets and decorative overlaid plywoods possess high surface hardness and excel in heat resistance and chemical resistance. They nevertheless are deficient in flexibility and are liable to sustain cracks or fractures during the course of transportation or fabrication. They also have the disadvantage that they tend to sustain cracks owing to changes in such environmental conditions as temperature and humidity and they exhibit poor light resistance.

The decorative laminated sheets and decorative overlaid plywoods using melamine resin, for example, enjoy improvement in gloss, water resistance, and chemical resistance when they are cured under the conditions used during the course of forming. They nevertheless have the disadvantage that the crack resistance is degraded as the curing proceeds further. None of the decorative laminated sheets and decorative overlaid plywoods known to the art fulfils all the physical properties.

The copolycondensate of cyclohexanecarboguanamine or norbornanecarboguanamine with melamine, to be used in the present invention and the use of this copolycondensate as a material for molding are dislcosed in U.S. Pat. No. 3,379,661. It has been known that the shaped articles obtained from this molding material are excellent in light resistance and stain resistance. The U.S. Patent discloses nothing about the use of the copolycondensate in decorative laminated sheets or decorative overlaid plywoods. Because the method is used for forming the copolycondensate as the molding material to produce a shaped article, it does not follow that this method ought to be applicable to the production of decorative laminated sheets and decorative overlaid plywoods using the same copolycondensate. Further, it has been difficult to conceive out of the prior art a method for the production of the aforementioned copolycondensate in form fit for the production of decorative laminated sheets or decorative overlaid plywoods. The U.S. Patent makes absolutely no mentioned of the copolycondensate's flexibility and crack resistance. It has been difficult, therefore, to find out of the prior publication the possibility of the copolycondensate yielding the various properties which decorative laminated sheets and decorative overlaid plywoods are expected to possess.

An object of this invention, therefore, is to provide novel decorative laminated sheets and decorative overlaid plywoods.

Another object of this invention is to provide a decorative laminated sheet which possess high surface hardness and excels in flexibility, gloss, light resistance, stain resistance, water resistance, chemical resistance, and crack resistance and a decorative overlaid plywood having a resin-impregnated sheet layer integrated with a substrate and excelling in surface hardness, gloss, light resistance, stain resistance, water resistance, chemical resistance and crack resistance.

SUMMARY OF THE INVENTION

The object described above are accomplished by a thermosetting resin decorative laminated sheet faced with a resin-impregnated sheet layer obtained by impregnating a sheetlike material with a resin composition containing an amino resin (I) produced by the reaction of formaldehyde with an amino compound (A) containing as an essential component thereof at least one carboguanamine (a) represented by the formula I:

wherein X is $CH_2$ and n is 0 or 1, and curing the impregnated sheetlike material.

These objects are also accomplished by a decorative overlaid plywood having integrated with a substrate a resin-impregnated sheet layer obtained by impregnating a sheetlike material with a resin composition containing an amino resin (I) produced by the reaction of formaldehyde with an amino compound (A) containing as an essential component thereof at least one carboguanamine (a) represented by the formula I and curing the impregnated sheetlike material.

DESCRIPTION OF PREFERRED EMBODIMENT

The term "decorative laminated sheet" as used in the present invention refers to a sheet which is faced with a resin-impregnated sheet layer obtained by impregnating a sheetlike material such as paper or cloth with a resin composition containing an amino resin and curing the resultant impregnated sheetlike material. The term "decorative overlaid plywood" refers to a composite obtained by integrating the resin-impregnated sheet layer in cured form with a substrate.

The resin composition to be used in the present invention contains an amino resin (I) which is produced by the reaction of formaldehyde with an amino compound (A) containing as an essential component thereof at least one carboguanamine represented by the formula I. Typical examples of the carboguanamine (a) represented by the formula I are cyclohexanecarboguanamine represented by the formula II and norbornanecarboguanamine represented by the formula III. The amino compound (A) essentially contains either or both of the carboguanamines mentioned above in desired proportion.

In the present invention, the use of the carboguanamine (a) as the amino compound (A) signifies the intention of imparting highly desirable flexibility, crack resistance, and light resistance to the produced decorative laminated sheet or decorative overlaid plywood without impairing such properties as surface hardness, gloss, stain resistance, water resistance, and chemical resistnace as well as good appearance possessed inherently by the conventional decorative laminated sheet or decorative overlaid plywood and, at the same time, improving the workability during the course of the production of the decorative laminated sheet or decorative overlaid plywood.

The amino resin (I) of this invention acquires solubility in organic solvents or solubility in water as one quality thereof, depending on the particular method to be employed for the production thereof. In the process of impregnating the sheetlike material with the resin to be described specifically later on, therefore, it can be used in the form of a solution in an organic solvent or in the form of an aqueous solution.

The amino resin (I) soluble in organic solvents is generally obtained by causing the amino compound (A) to react with formaldehyde by application of heat in an aqueous solution, treating the resultant reaction mixture so as to expel water and the unaltered formaldehyde, and then cooling the residue of the treatment to room temperature thereby giving rise to the amino resin (I) in solid form. The amount of the formaldehyde to be used in this case is desired to be in the range of 1.2 to 10 mols preferably 1.5 to 4 mols, per mol of the amino compound (A). If this amount exceeds 10 mols, the effect of this compound on the reaction is not obtained sufficiently. If it is less than 1.2 mols, the reaction does not proceed sufficiently. In terms of the ease of procurement, it is desirable to employ paraformaldehyde or a commercially available aqueous formalin solution as the formaldehyde to be used in the reaction. The amino compound (A) thus used in the reaction may contain such triazines as melamine, benzoguanamine, and acetoguanamine or urea, dicyandiamide, and phenols in a combined amount incapable of impairing the solubility of the amino resin (I) in organic solvents. Such properties as flexibility, crack resistance, and water resistance which characterize the use of the carboguanamine (a) are improved in proportion as the carboguanamine (a) content in the amino compound (A) is increased. The carboguanamine (a) content in the amino compound (A), therefore, is preferable to be in the range of 60 to 100% by weight, preferably 95 to 100% by weight.

The degree of methanol miscibility, $M_1$, of this amino resin (I) soluble in organic solvents is preferable to be in the range of 1 to 200, preferably 1 to 150. If the degree of methanol miscibility, $M_1$, is less than 1, the degree of condensation of the amino resin (I) is so high as to lower the solubility thereof in an organic solvent. Conversely, if it exceeds 200, the degree of condensation is so low as to render the molding difficult.

The term "degree of methanol miscibility, $M_1$," as used herein refers to the magnitude which is obtained by dissolving 2 g of a given amino resin (I) soluble in organic solvents in 5 ml of methanol, adding water dropwise to the resultant solution at 25° C. until the solution produces a suspension in opaque form, add calculating the following formula using the amount of water ($W_1$) (in g) added dropwise until the occurrence of the suspension.

Degree of methanol miscibility, $M_1 = (W_1/2) \times 100$

From the amino resin (I) soluble in organic solvents, the decorative laminated sheet or decorative overlaid plywood may be produced by preparing a resin composition using the amino resin (I) soluble in organic solvents, when necessary, in combination with such thermosetting resins as benzoguanamine resin, unsaturated polyester resin, alkyd resin, and phenol resin, and impregnating a sheetlike material with the resin composition. These additive thermosetting resins are desired to be used in a combined amount incapable of impairing the characteristic properties of the carboguanamine (a). Generally, this combined amount is in the range of 10 to 150 parts by weight, preferably 10 to 100 parts by weight, based on 100 parts by weight of the amino resin (I). Among other additive thermosetting resins mentioned above, the unsaturated polyester resin and/or the alkyd resin are used particularly advantageously because such adverse phenomena as foaming or resin separation are not observed at all when the sheetlike material impregnated with the resin composition incorporating these additives therein is dried. Thus, these particular additive thermosetting resins contribute to improving the workability.

From the resin composition mentioned above, the decorative laminated sheets or the decorative overlaid plywoods are obtained by dissolving the resin composition in an organic solvent, impregnating a sheetlike material with the resultant solution, and drying and curing the impregnated sheetlike material.

As examples of the organic solvent which is used in this case, ketones such as acetone, methylethyl ketone, and cyclohexanone, esters such as ethyl acetate and butyl acetate, and mixed solvent of such aliphatic saturated alcohols as methanol, ethanol, and butanol with such aliphatic hydrocarbons as hexane, cyclohexane, and petroleum ether and/or such aromatic hydrocarbons as benzene, toluene, and xylene can be cited. Where colored or printed paper and/or cloth are used as sheetlike materials for the impregnation, the use of a ketone and an ester as solvent generally could result in discoloration of the sheetlike material. To avoid this mishap, it is proper to use a mixed solvent of an aliphatic saturated alcohol with an aliphatic hydrocarbon and/or an aromatic hydrocarbon.

The water-soluble amino resin (I) is obtained by causing an amino compound (A) containing melamine and/or urea to react with formaldehyde. In the light of the nature of the decorative laminated sheet or the decorative overlaid plywood, the amino compound (A) used herein is desired to contain carboguanamine (a) and melamine. To be specific, this production of the water-soluble amino resin (I) is attained by a method which comprises causing the carboguanamine (a) and melamine to react with formaldehyde by application of heat in an aqueous solution and cooling the resultant reaction mixture to room temperature. The reaction solution consequently obtained is used as an aqueous solution of the amino resin (I). In this case, for this solution to be obtained in homogeneous and stable form, the solids content in the reaction solution at the end of the reaction is preferable to be in the range of 40 to 70% by weight. The production of the decorative laminated sheet or decorative overlaid plywood from this reaction solution is generally obtained by preparing a resin solution of a desired concentration from the reaction solution, when necessary, by addition of water and/or water soluble solvent and subsequently impregnating a sheetlike material with the resin solution. Suitably the solvent to be used for the water soluble solvent is methanol, ethanol, isopropanol, and acetone, for example.

The amount of melamine to be contained in the amino compound (A) is desired to be in a range such that the amino resin (I) assumes sufficient solubility in water and avoids impairing such properties as flexibility and crack resistance which characterize the carboguanamine (a). Generally this amount is in the range of 20 to 80% by weight, preferably 20 to 40% by weight. The amount of carboguanamine (a) contained in the amino compound (A) is in the range of 20 to 80% by weight, preferably 60 to 80% by weight. The amino compound (A) may contain amino compounds other than carboguanamine (a) and melamine such as acetoguanamine, benzoguanamine and urea in a suitable amount, preferably less than 50% by weight, more preferably less than 20% by weight. The amount of formaldehyde to be used is preferable to be in the range of 1.2 to 10 mols, preferably 1.5 to 4 mols, per mol of the amino compound (A). If the amount is less than 1.2 mols, the reaction does not proceed sufficiently. Conversely if this amount exceeds 10 mols, the excess fails to produce any appreciable effect and proves only wasteful. For the produciton of the decorative laminated sheets or decorative overlaid plywoods by the use of the water-soluble amino resin (I), the amino resin (I) is desired to be a homogeneous stable solution. The amino resin (I), therefore, is desired to possess a suitable condensation degree. As a criterion for the condensation degree, it is convenient to determined the degree of methanol miscibility, $M_2$, of the aqueous solution of the amino resin (I) which is a reaction product.

The degree of methanol miscibility, $M_2$, of the aqueous solution of the amino resin (I) is determined by causing a given amino compound (A) to react with formaldehyde in an aqueous solution, dissolving 5 g of the resultant reaction solution in 5 ml of methanol, adding water dropwise at 25° C. to the resultant methanol solution until the solution produces an opaque suspension, and calculating the following formula using the amount of the water ($W_2$) (in g) spent in the dropwise addition.

Degree of methanol miscibility, $M_2 = (W_2/5) \times 100$

The degree of methanol miscibility, $M_2$, of the water-soluble amino resin (I) is in the range of 30 to 200, preferably 90 to 200. If the miscibility is less than 30 or exceeds 200, the solution of the amino resin (I) is so deficient in stability as to render it difficult to obtain a decorative laminated sheet or decorative overlaid plywood of highly desirable quality. The solution of the amino resin (I) may incorporate therein the conventional modifier for the melamine resin such as, for example, polyvinyl alcohol or polyvinyl acetate before it is put to use in the production of the decorative laminated sheet or decorative overlaid plywood.

The production of the decorative laminated sheet or decorative overlaid plywood by the use of the resin composition containing the amino resin (I) as contemplated by the present invention is attained by impregnating a sheetlike material with the resin composition and subsequently drying and curing the impregnated sheetlike material.

The amount of the amino resin (I) with which the sheetlike material is impregnated is in the range of 70 to 150% by weight, preferably 90 to 130% by weight, as resin solids based on the weight of the sheetlike material.

The impregnation of the sheetlike material with the resin composition is easily accomplished generally by transforming the resin composition into a solution with a suitable organic solvent and/or water, applying the resultant solution to the sheetlike material or immersing the sheetlike material in the solution, and then drying the impregnated sheetlike at room temperature or under application of heat thereby effecting the expulsion of the volatile component to the fullest possible extent.

No specific limits are fixed on the kind of the sheetlike material to be used as described above, except for the sole requirement that the sheetlike material should be readily impregnable with the liquid composition. Paper, cloth, and veneer are desirable sheetlike materials in the sense that they are readily available commercially, excellent in quality, and capable of ready production of a decorative laminated sheet or decorative overlaid plywood.

The curing of the impregnated sheetlike material may be accelerated, when necessary, by the addition of a curing catalyst. Though this curing catalyst is not specifically limited, it may be suitably selected to suit the components making up the amino resin (I) among the conventional curing catalysts for thermosetting resin such as, for example, paratoluenesulfonic acid and ammonium chloride.

The thermosetting resin decorative laminated sheet of the present invention is faced with the resin-impregnated sheet layer obtained by the aforementioned procedure which comprises impregnating the sheetlike material with the resin composition containing the amino resin (I) and then drying and curing the impregnated sheetlike material. This production can be attained by various methods. Examples are as follows:

(1-a) A method which comprises thermally curing the sheetlike material impregnated with the resin composition under application of pressure.

(2-a) A method which comprises superposing two or more sheetlike material impregnated with the resin composition and thermally curing the superposed sheetlike materials under application of pressure.

(3-a) A method which comprises superposing at least one sheetlike material impregnated with the resin composition, a sheetlike material impregnated with a composition of other thermosetting resin (II) than the amino resin (I), and/or at least one sheetlike material impregnated with a composition of a thermoplastic resin and thermally curing the superposed sheetlike materials under application of pressure.

(4-a) A method which comprises preparing a resin-impregnated sheet layer by thermally curing at least one sheetlike material impregnated with the resin composition under application of pressure and subsequently joining the resin-impregnated sheet layer to at least one sheetlike material impregnated with a composition of a thermosetting resin (II) and cured, and/or at least one sheetlike material impregnated with the thermoplastic resin by the use of suitable adhesive agent.

In these methods, the use of a mirror plate for the application of pressure proves to be desirable because the produced decorative laminated sheets acquire a surface of high gloss and good appearance. Among the specific methods cited above, those of (3-a) and (4-a), though slightly more expensive than the other methods, are capable of producing decorative laminated sheets which are highly excellent in flexibility and crack resistance as well as such properties as hardness, light resistance, gloss, stain resistance, crack resistance, water resistance, and chemical resistance which are important surface properties for decorative laminated sheets.

The decorative overlaid plywood of this invention has the aforementioned resin-impregnated sheet layer integrated with a substrate. Various substrates of both natural and synthetic origins and of both inorganic and organic qualities are available for the purpose of this integration. Generally a veneer plywoods, a hard-fiber boards, a particle board, for example, are used advantageously. The integration of the resin- impregnated sheet layer with the substrate can be effected by any of the methods heretofore followed. Examples are as follows.

(1-b) A method which comprises applying at least one sheetlike material impregnated with the resin composition to the substrate and then thermally curing the impregnated sheetlike material under application of pressure.

(2-b) A method which comprises superposing at least one sheetlike material impregnated with the resin composition, a sheetlike material impregnated with a composition of other thermosetting resin (II) than the amino resin (I), and/or at least one sheetlike material impregnated with the composition of a thermoplastic resin and then thermally curing the superposed sheetlike materials under application of pressure.

In the production of the decorative laminated sheet or decorative overlaid plywood of the present invention, the curing temperature may be suitably selected in the range of 80° C. to 300° C. Preferably, this range is 110° to 250° C. Suitably, the curing time is generally in the range of 1 to 60 minutes where the curing temperature is in the range mentioned above. The pressure under which the curing is carried out is required to be not less than 3 kg/cm$^2$. If this pressure is less than 3 kg/cm$^2$, the produced decorative laminated sheet or decorative overlaid plywood does not easily acquire a substantially perfectly smooth and flat surfaces.

Examples of the thermosetting resin (II) to be used advantageously in place of the amino resin (I) in the methods (3-a), (4-a), and (2-b) include alkyd resin, phenol resin, xylene resin, toluene resin aminoaldehyde resin, unsaturated polyester resin, and mixtures thereof. Examples of the thermoplastic resin include vinyl chloride, vinyl acetate, and polymers and copolymer of styrene.

The thermosetting resin decorative laminated sheet of this invention excels in surface hardness, gloss, stain resistance, water resistance, light resistance, and chemical resistance, because it is produced by the use of the amino reisn (I) obtained from the amino compound (A) containing as an essential component thereof the carboguanamine (a) possessing a specific structure. It also excels in crack resistance and flexibility. It can be easily applied fast by the use of a suitable adhesive agent, therefore, to various articles of furniture in varying shapes, to tables, and to walls, for example. It provides the surfaces of these articles with lasting protection.

The decorative overlaid plywood of this invention excels in hardness, gloss, stain resistance, water resistance, chemical resistance, and crack resistance. During the course of production or actual use, therefore, it sustains neither scratch nor crack on collision against hard objects, permits easy fabrication, and fully withstands protracted service under indoor and outdoor conditions. The decorative overlaid plywood of the present invention, therefore, can be advantageously used as surface materials for wall units, desks, tables, and laboratory benches and as concrete panels, ceiling units, and partition units, for example.

The amino resin (I) to be used in the present invention can be endowed with solubility in organic solvents or solubility in water, depending on the particular method adopted for the production thereof. The operation of the impregnation of the sheetlike material, therefore, can be carried out by a method using an organic solvent or an aqueous solution. The solution of the amino resin (I) in the organic solvent or the aqueous solution of the amino resin (I) is homogeneous and stable and is advantageously used in impregnating the sheetlike material and producing the decorative laminated sheet or decorative overlaid plywood excellent in quality. Particularly when the amino resin (I) soluble in organic solvents is used as a solution in an organic solvent, the solution exhibits stability for an extremely long period.

When the decorative laminated sheet or decorative overlaid plywood is produced by using the amino resin (I) soluble in organic solvents, it enjoys the advantage that it is cured effectively under conditions falling in wide ranges formed and worked easily, and fabricated even by the hot-hot technique with high efficiency without entailing any appreciable warping.

of the methanol miscibility, $M_1$, of these amino resins (I-1) to (I-4) were as shown in Table 1.

TABLE 1

| Amino resin | Production Example 2 (I-2) | Production Example 3 (I-3) | Production Example 4 (I-4) |
|---|---|---|---|
| Composition of raw materials (parts) | | | |
| Cyclohexanecarboguanamine | 100 | | 80 |
| Norbornanecarboguanamine | | 100 | |
| Benzoguanamine | | | 20 |
| Aqueous 37% formaldehyde solution | 127 | 79 | |
| Aqueous 10% sodium carbonate solution | 0.33 | 0.33 | 0.4 |
| Reaction conditions | | | |
| Reaction time at 90°C. (hr) | 4 | 2 | 4 |
| Reaction time at 100°C. (hr) | 0 | 4 | 3 |
| Degree of methanol miscibility, $M_1$ | 110 | 40 | 30 |

Now, the present invention, will be described more specifically below with reference to working examples. It should be noted, however, that the present invention is not limited by these working examples. Wherever parts and percents (%) are mentioned in the examples, they are meant invariably as those by weight unless otherwise specified.

PRODUCTION EXAMPLE 1

In a reaction vessel provided with a stirrer, a reflux condenser, and a thermometer, 100 parts of cyclohexanecarboguanamine, 127 parts of an aqueous 37% formaldehyde solution, and 0.33 part of an aqueous 10% sodium carbonate solution were stirred and left reacting at 90° C. for two hours. The reaction solution was then heated at 100° C. for four hours to induce polycondensation and distillation for expulsion of water and the unaltered formaldehyde by distillation. It was further heated up to 120° C. to effect removal of the remaining water and unaltered formaldehyde to obtain a solid amino resin (I-1). The degree of methanol miscibility, $M_1$, of this amino resin (I-1) was 7.

PRODUCTION EXAMPLES 2-4

Amino resins (I-2) to (I-4) were obtained by following the procedure of Production Example 1, except that the composition of raw materials and the conditions of reaction were varied as shown in Table 1. The degrees

PRODUCTION EXAMPLE 5

In the same reaction vessel as used in Production Example 1, 70 parts of cyclohexanecarboguanamine, 30 parts of melamine, and 156 parts of an aqueous 37% formaldehyde solution were mixed and the mixture was adjusted to pH 8.0 by the addition of an aqueous 5% sodium carbonate solution. The reaction solution was then stirred and left reacting at 95° C. for 40 minutes. It was cooled to room temperature, to produce an aqueous solution of amino resin (I-5). The concentration of this aqueous amino resin solution (I-5), the degree of methanol miscibility, $M_2$, thereof and the stability thereof were as shown in Table 2.

PRODUCTION EXAMPLES 6-9

Aqueous amino resin solution (I-6) to (I-9) were obtained by following the procedure of Production Example 5, except that the composition of raw materials and the reaction time were changed as shown in Table 2. The concentration of the aqueous amino resin solution (I-6) to (I-9), the degree of methanol miscibility, $M_2$, thereof and the stability thereof were as shown in Table 2.

TABLE 2

| Production Example No. | 5 | 6 | 7 | 8 | 9 |
|---|---|---|---|---|---|
| Aqueous amino resin solution | (I-5) | (I-6) | (I-7) | (I-8) | (I-9) |
| Composition of raw materials (parts) | | | | | |
| Cyclohexanecarboguanamine | 70 | 50 | 30 | 70 | 70 |
| Melamine | 30 | 50 | 70 | 30 | 30 |
| Aqueous 37% formaldehyde solution | 156 | 159 | 127 | 156 | 156 |
| Reaction time at 95° C. (min) | 40 | 90 | 170 | 30 | 50 |
| Quality of aqueous amino resin solution | | | | | |
| Concentration (%) | 58 | 48 | 53 | 56 | 60 |
| Degree of methanol miscibility, $M_2$ | 150 | 107 | 106 | 183 | 80 |
| Stability* | Not less than 2 days | Not less than 2 days | Not less than 2 days | Not less than 2 days | One day |

*Days on which occurrence of opaque was caused by left standing at 30° C.

Resin composition solution (I) to (X) shown in Table 3 were prepared using the amino resins (I-1) to (I-9) and they were used in the following working examples.

TABLE 3

| Resin composition solution | I | II | III | IV | V | VI | VII | VIII | IX | X |
|---|---|---|---|---|---|---|---|---|---|---|
| Amino resin (I) used | I-1 | I-2 | I-3 | I-1 | I-4 | I-5 | I-6 | I-7 | I-8 | I-9 |
| Percentage composition (parts) | | | | | | | | | | |
| Amino resin (I) | 50 | 50 | 50 | 70 | 50 | 180 | 180 | 180 | 180 | 180 |
| AD-24 | — | — | — | 30 | — | — | — | — | — | — |
| p-Toluenesulfonic acid | 1.0 | 1.0 | 1.0 | 1.4 | 1.0 | — | — | — | — | — |
| Ammonium chloride | — | — | — | — | — | 0.1 | 0.1 | 0.1 | 0.1 | 0.1 |
| Perbutyl Z | — | — | — | 0.3 | — | — | — | — | — | — |

TABLE 3-continued

| Resin composition solution | I | II | III | IV | V | VI | VII | VIII | IX | X |
| --- | --- | --- | --- | --- | --- | --- | --- | --- | --- | --- |
| Lauric acid | 0.75 | 0.75 | 0.75 | 1.5 | 0.75 | 1.5 | 1.5 | 1.5 | 1.5 | 1.5 |
| Methanol | 40 | 40 | 40 | 80 | 40 | 20 | 20 | 20 | 20 | 20 |
| Toluene | 10 | 10 | 10 | 20 | 10 | — | — | — | — | — |

AD-24: Unsaturated polyester resin (produced by Nippon Shokubai Kagaku Kogyo Co., Ltd.)
Perbutyl Z: t-Butyl peroxy benzoate (Produced by Nippon Oils & Fats Co., Ltd.)

EXAMPLE 1

A decorative paper possessing a thickness of 0.12 mm and a weight of 81 g/m$^2$ and having a wood grain pattern printed thereon was immersed in the resin composition solution (I). The impregnated paper was then dried in draft at room temperature and further dried at 100° C. for 10 minutes with hot air. Consequently, a decorative paper having the resin impregnated in a ratio of 120% based on the weight of the original paper was obtained.

One decorative paper impregnated with the resin was superposed on two sheets of phenol resin-impregnated kraft paper each 0.3 mm in thickness and weight of 242 g/m$^2$ and thermally cured for 15 minutes with a mirror plate of stainless steel at 140° C. under a pressure of 15 kg/cm$^2$. Consequently, there was obtained a beautiful decorative laminated sheet (1) possessing high gloss.

When this decorative laminated sheet (1) was applied with a neoprene type adhesive agent to an article of furniture possessing a radius of curvature of 40 mm, it retained a beautiful condition intact. The properties of this decorative laminated sheet (1) are shown in Table 4.

The resin composition solution (I), even after more than one month's standing at room temperature, retained stable constitution without inducing any sedimentation of solids.

EXAMPLE 2

A decorative paper possessing a thickness of 0.2 mm and a weight of 120 g/m$^2$ and having a marble pattern printed thereon was immersed in the resin composition solution (II). The impregnated paper was dried in draft at room temperature and further dried at 100° C. for 12 minutes with hot air. Consequently, there was obtained a decorative paper impregnated with the resin in a ratio of 123% based on the weight of the original paper.

This decorative paper impregnated with the resin, one kraft paper having a thickness of 0.3 mm and weight of 242 g/m$^2$, and impregnated with phenol resin, and one white broad cloth (yarn number count 80) impregnated with vinyl chloride resin were superposed and thermally cured with a chromium-late mirror plate for 10 minutes at 150° C. under a pressure of 25 kg/cm$^2$. Consequently, there was obtained a beautiful decorative laminated sheet (2) possessing high gloss. When this decorative laminated sheet (2) was applied to an article of furniture in the same manner as in Example 1, it showed no abnormal sign. The properties of this decorative laminated sheet (2) are shown in Table 4.

The resin composition solution (II), even after more than one month's standing at room temperature, retained stable constitution without inducing any sedimentation of solids.

EXAMPLE 3

A beautiful decorative laminated sheet (3) possessing high gloss was obtained by repeating the procedure of Example 1, except that the resin composition-solution (III) was used in place of the resin composition solution (I). The properties of this decorative laminated sheet (3) are shown in Table 4.

When this decorative laminated sheet (3) was applied to an article of furniture in the same manner as in Example 1, it showed no abnormal sign.

The resin composition solution (III), even after more than one month's standing at room temperature, retained stable constitution without inducing any sedimentation of solids.

EXAMPLE 4

A white plain cotton linter paper possessing a weight of 80 g/m$^2$ was immersed in the resin composition solution (I), dried in draft, and further dried with hot air at 100° C. for ten minutes to obtain a cotton linter paper impregnated with the resin in a ratio of 110%, based on the weight of the original paper. And then, six sheets of the cotton linter paper impregnated with the resin were superposed and thermally cured for 10 minutes with a mirror plate of stainless steel at 150° C. under a pressure of 30 kg/cm$^2$. Consequently, there was obtained a beautiful decorative laminated sheet (4) possessing high gloss. The properties of this decorative laminated sheet (4) are shown in Table 4.

By the method of JIS K-6911, this decorative laminated sheet (4) was found to possess a bending strength of 430 kgf/cm$^2$.

EXAMPLE 5

A white plain TiO$_2$-filled paper possessing a thickness of 0.12 mm and a weight of 100 g/m$^2$ was immersed in the resin composition solution (I). The impregnated TiO$_2$-filled paper was dried in draft at room temperature and then dried with hot air at 100° C. for 20 minutes. Consequently, there was obtained a TiO$_2$-filled paper impregnated with the resin in a ratio of 110%, based on the weight of the original paper. This TiO$_2$-filled paper and one kraft paper possessing a thickenss of 0.3 mm and a weight of 242 g/m$^2$ and impregnated with phenol resin were superposed and thermally cured with a mirror plate of stainless steel for 10 minutes at 150° C. under a pressure of 15 kg/cm$^2$. Consequently, there was obtained a beautiful decorative laminated sheet (5) possessing high gloss. The properties of this decorative laminated sheet (5) are shown in Table 4.

EXAMPLES 6 TO 12

Beautiful decorative laminated sheets (6) to (12) possessing high gloss were obtained by repeating the procedure of Example 5, except that the resin composition solution, the conditions for the hot-air drying of the impregnated TiO$_2$-filled paper and the conditions for the thermal curing for the production of decorative laminated sheet were changed as shown in Table 4. The properties of these decorative laminated sheets (6) to (12) are shown in Table 4.

The TiO$_2$-filled paper obtained in Example 6 after the hot air drying did not completely sustain foaming or resin separation at all and was easier to handle.

CONTROL 1

A resin composition solution (I') for comparison was prepared by combining 50 parts of benzoguanamine resin (produced by Nippon Shokubai Kagaku Kogyo Co., Ltd. and marketed under product code of "DBG"), 1.0 part of p-toluenesulfonic acid, 0.75 part of lauric acid, 40 parts of methanol, and 10 parts of toluene. A decorative laminated sheet (1) for comparison was obtained by repeating the procedure of Example 4, except that the resin composition solution (I') for comparison was used in place of the resin composition solution (I). The properties of this decorative laminated sheet (1) for comparison are shown in Table 4.

CONTROL 2

In a similar vessel as used in Production Example 1, 126 parts of melamine and 243 parts of an aqueous 37% formaldehyde solution were mixed and the resultant mixture was adjusted to pH 8.0 by the addition of an aqueous 5% sodium carbonate solution. The reaction solution thus obtained was stirred and heated up to 65° C. Thus stirring was further continued at 65° C. for 15 minutes. After this reaction, the reaction solution was cooled and diluted with methanol to produce an amino resin solution (I') for comparison having a nonvolatile content of 50%.

In a resin composition solution (II') for comparison obtained by stirring 200 parts of the amino resin solution (I') for comparison, 0.1 part of ammonium chloride, and 1.5 parts of lauric acid, a white plain $TiO_2$-filled paper possessing a thickness of 0.12 mm and weight of 100 g/m$^2$ was immersed. The resultant impregnated $TiO_2$-filled paper was dried in draft at room temperature. The $TiO_2$-filled paper was dried with hot air at 80° C. for 15 minutes. This $TiO_2$-filled paper and one kraft paper possessing a thickness of 0.3 mm and weight of 242 g/m$^2$ and impregnated with phenol resin were superposed and thermally cured with a mirror plate of stainless steel for 10 minutes at 130° C. under a pressure of 15 kg/cm$^2$. Consequently, there was obtained a decorative laminated sheet (2) for comparison. The properties of this decorative laminated sheet (2) for comparison are shwon in Table 4.

tests performed on these decorative laminated sheets. The properties involved in the tests were determined by the following methods. The test items suffixed by a parenthesized J, were those which were carried out by procedures specified in Japanese Industrial Standard (JIS) K 6902 (1977).

Surface hardness—This property was determined by performing the test A for scratch hardness specified by JAS (Japanese Agricultural standard) on special plywood and rating the results on the two-point scale, wherein O is passage of the standard and X is failure to pass the standard.

Light resistance—This property was determined by subjecting a test piece to 200 hours' standing in a fade tester, measuring the degree of discoloration (yellowing) in terms of the Δb (Lab) value at the end of the standing, and rating the results by the three-point-scale, wherein O is less than 0.5, Δ is not less than 0.5 and less than 3, and X is not less than 3.

Water resistance (J)—This property was determined by subjecting a test piece to a test for resistance to boiling and rating the results on the two-point scale, wherein O is absence of interlayer separation and X is presence of interlayer separation.

Stain resistance (J)—This property was determined by subjecting a test piece to a test for stain resistance and rating the results on the three-point scale, wherein O is absence of change, Δ is presence of contamination which could be easily removed with solvent or dry cloth or which showed a slight sign of change after treatment with solvent or dry cloth, and X is presence of heavy contamination.

Crack resistance—This property was determined by punching a test piece, examining the appearance of the test piece after the punching, and rating the results on the three-point scale, wherein O is absence of change, Δ is occurrence of burrs along the edge of the hole produced by the punching, and X is occurrence of fracture, crack, or separation along the hole.

Chemical resistance—This property was determined by subjecting a test piece to a test for resistance to alkalis and a test for resistance to acids in accordance with the procedure specified in JAS on special plywood and rating the results on the two-point scale, wherein O is absence of change and X is presence of change.

TABLE 4

| Ex. No. | Decorative laminated sheet | Resin composition solution used | Drying conditions Temp. (°C.) | Drying conditions Time (min) | Curing conditions Temp. (°C.) | Curing conditions Time (min) | Curing conditions Pressure (kg/cm$^2$) | Surface hardness | Light resistance | Water resistance | Stain resistance | Crack resistance | Chemical resistance |
|---|---|---|---|---|---|---|---|---|---|---|---|---|---|
| 1 | (1) | (I) | 100 | 10 | 140 | 15 | 15 | O | — | O | O | O | O |
| 2 | (2) | (II) | 100 | 12 | 150 | 10 | 25 | O | O | O | O | O | O |
| 3 | (3) | (III) | 100 | 10 | 140 | 15 | 15 | O | — | O | O | O | O |
| 4 | (4) | (I) | 100 | 10 | 150 | 10 | 30 | O | O | O | O | O | O |
| 5 | (5) | (I) | 100 | 20 | 150 | 10 | 15 | O | O | O | O | O | O |
| 6 | (6) | (IV) | 100 | 20 | 150 | 10 | 15 | O | O | O | O | O | O |
| 7 | (7) | (V) | 100 | 20 | 150 | 10 | 15 | O | Δ | O | O | O | O |
| 8 | (8) | (VI) | 100 | 10 | 150 | 10 | 15 | O | O | O | O | O | O |
| 9 | (9) | (VII) | 100 | 7 | 140 | 10 | 15 | O | O | O | Δ | Δ | O |
| 10 | (10) | (VIII) | 100 | 7 | 130 | 10 | 15 | O | O | O | Δ | Δ | O |
| 11 | (11) | (IX) | 100 | 10 | 150 | 10 | 15 | O | O | O | O | O | O |
| 12 | (12) | (X) | 100 | 10 | 150 | 10 | 15 | O | O | O | Δ | O | O |
| Control 1 | (1)* | (I')* | 100 | 10 | 150 | 10 | 30 | O | X | O | O | O | O |
| 2 | (2)* | (II')* | 80 | 15 | 130 | 10 | 15 | O | O | O | X | X | O |

*means "for comparison"

Table 4 shows the conditions for the production of the decorative laminated sheets (1) to (12) of Examples 1 to 12 and the decorative laminated sheets (1) and (2) for comparison of Controls 1 and 2 and the results of

EXAMPLE 13

In the resin composition solution (I), a white plain TiO$_2$-filled paper possessing a thickness of 0.12 mm and a weight of 100 g/m$^2$ was immersed. The impregnated TiO$_2$-filled paper was dried in draft at room temperature. The TiO$_2$-filled paper was then dried with hot air at 100° C. for a varying time indicated in Table 5. This TiO$_2$-filled paper and one kraft paper impregnated with phenol resin and possessing a thickness of 0.3 mm and a weight of 242 g/m$^2$ were superposed and thermally cured with a mirror plate of stainless steel for 10 minutes at 150° C. under a pressure of 15 kg/cm$^2$, to find the relation between the drying time and the degree of curing obtained in the produced decorative laminated sheet. The results are shown in Table 5. From Table 5, it is noted that beautiful decorative laminated sheets possessing high gloss and reflecting proper degree of curing were obtained in wide range of drying time.

Figure 1:
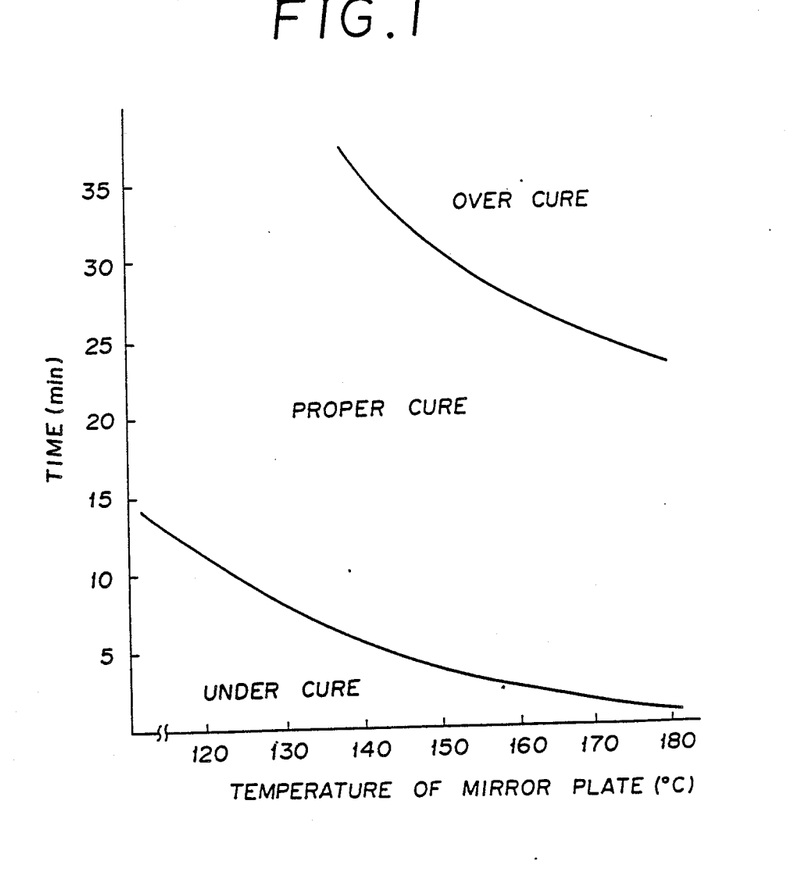
FIG. 1 is a graph showing the optimum curing region expressed with the relation between the mirror plate temperature and the heating time obtained of a typical decorative laminated sheet embodying the present invention.

Separately, the same TiO$_2$-filled paper impregnated and dried in draft in the same manner as described above was dried with hot air at 100° C. for 20 minutes. This TiO$_2$-filled paper and one kraft paper impregnated with phenol resin and possessing a thickness of 0.3 mm and a weight of 242 g/m$^2$ were superposed and thermally cured with a mirror plate under a pressure of 15 kg/cm$^2$ at a varying temperature for a varying time both indicated in FIG. 1, to find the relation between the curing time and temperature and the degree of curing obtained in the produced decorative laminated sheet. The results are shown in FIG. 1. From FIG. 1, it is noted that beautiful decorative laminated sheets possessing high gloss and reflecting proper degree of curing were obtained in wide ranges of mirror plate temperatures and curing times.

The degree of curing was determined by subjecting a given decorative laminated sheet to a test for stain resistance and a test for resistance to boiling by respective procedures specified in JIS K 6902 (1977). The results were rated on the three-point scale, wherein "under cure" stands for presence of change produced during the course of the test for stain resistance and presence of interlayer separation produced during the course of the test for resistance to boiling, "over cure" for presence of interlayer separation produced during the course of test for resistance to boiling, and "proper cure" for absence of change during the course of test for stain resistance or test for resistance to boiling.

TABLE 5

| Drying time (min.) | 5 | 10 | 15 | 20 | 25 | 30 |
|---|---|---|---|---|---|---|
| Degree of curing (Example 13) | O | O | O | O | O | O |

The degree of curing was determined by subjecting a given decorative laminated sheet to a test for stain resistance and a test for resistance to boiling by respective procedures specified in JIS K 6902 (1977). The results were rated on the two-point scale, wherein O is passage of both the standards and X is failure to pass either or both of the standards.

Standard for passage:
Stain resistance—Absence of change
Resistance to boiling—Absence of interlayer separation

EXAMPLE 14

A beautiful decorative overlaid plywood (1) possessing high gloss was obtained by repeating the procedure of Example 5, except that a veneer plywood possessing a thickness of 4 mm was used in the place of the phenol resin-impregnated kraft paper. The properties of this decorative overlaid plywood (1) are shown in Table 6.

EXAMPLES 15 TO 23

Beautiful decorative overlaid plywoods (2) to (10) possessing high gloss were obtained by repeating the procedure of Example 14, except that the resin composition solution, the conditions for hot-air drying of TiO$_2$-filled paper after impregnation with the resin solution, and curing conditions during the course of production of decorative overlaid plywood were varied as shown in Table 6. The properties of these decorative overlaid plywoods (2) to (10) are shown in Table 6.

CONTROL 3

A decorative overlaid plywood (1) for comparison was obtained by repeating the procedure of Example 14, except that the resin composition solution (I') for comparison was used in place of the resin composition solution (I). The properties of the decorative overlaid plywood (I) for comparison are shown in Table 6.

CONTROL 4

A decorative overlaid plywood (2) for comparison was obtained by repeating the procedure of Control 2, except that a veneer plywood possessing a thickness of 4 mm was used in the place of the phenol resin-impregnated kraft paper. The properties of this decorative overlaid plywood (2) for comparison are shown in Table 6.

TABLE 6

| Ex. No. | Decorative overlaid polywood | Resin composition solution used | Drying conditions Temp. (°C.) | Drying conditions Time (min) | Curing conditions Temp. (°C.) | Curing conditions Time (min) | Curing conditions Pressure (kg/cm$^2$) | Surface hardness | Light resistance | Water resistance | Stain resistance | Crack resistance | Chemical resistance |
|---|---|---|---|---|---|---|---|---|---|---|---|---|---|
| 14 | 1 | (I) | 100 | 20 | 150 | 10 | 15 | O | O | O | O | 25 | O |
| 15 | 2 | (II) | 100 | 20 | 150 | 10 | 15 | O | O | O | O | 26 | O |
| 16 | 3 | (III) | 100 | 20 | 150 | 10 | 15 | O | O | O | O | 25 | O |
| 17 | 4 | (IV) | 100 | 20 | 150 | 10 | 15 | O | O | O | O | 27 | O |
| 18 | 5 | (V) | 100 | 20 | 150 | 10 | 15 | O | Δ | O | O | 25 | O |
| 19 | 6 | (VI) | 100 | 10 | 150 | 10 | 15 | O | O | O | O | 20 | O |
| 20 | 7 | (VII) | 100 | 7 | 140 | 10 | 15 | O | O | O | Δ | 17 | O |
| 21 | 8 | (VIII) | 100 | 7 | 130 | 10 | 15 | O | O | O | Δ | 13 | O |
| 22 | 9 | (IX) | 100 | 10 | 150 | 10 | 15 | O | O | O | O | 20 | O |
| 23 | 10 | (X) | 100 | 10 | 150 | 10 | 15 | O | O | O | Δ | 19 | O |
| Con- | | | | | | | | | | | | | |

TABLE 6-continued

| Ex. No. | Decorative overlaid polywood | Resin composition solution used | Drying conditions Temp. (°C.) | Drying conditions Time (min) | Curing conditions Temp. (°C.) | Curing conditions Time (min) | Curing conditions Pressure (kg/cm$^2$) | Results of evaluation Surface hardness | Results of evaluation Light resistance | Results of evaluation Water resistance | Results of evaluation Stain resistance | Results of evaluation Crack resistance | Results of evaluation Chemical resistance |
|---|---|---|---|---|---|---|---|---|---|---|---|---|---|
| trol 3 | (1)* | (I')* | 100 | 20 | 150 | 10 | 15 | O | X | O | O | 25 | O |
| 4 | (2)* | (II')* | 80 | 15 | 130 | 10 | 15 | O | O | O | X | 10 | O |

*means "for comparison"

Table 6 shows the conditions for the production of the decorative overlaid plywoods (1) to (10) of Examples 14 to 23 and the decorative overlaid plywoods (1) and (2) for comparison of Controls 3 and 4 and the results of tests performed on these decorative overlaid plywoods. The properties involved in the tests were determined by the following methods. The test items suffixed by a parenthesized J, were those which were carried out by procedures specified in JIS K 6902 (1977).

Surface hardness - This property was determined by performing the test A for scratch hardness specified by JAS on special plywood and rating the results on the two-point scale, wherein O is passage of the standard and X is failure to pass the standard.

Light resistance—This property was determined by subjecting a test piece to 200 hours' standing in a fade tester, measuring the degree of discoloration (yellowing) in terms of the $\Delta b$ (Lab) value at the end of the standing, and rating the results by the three-point scale, wherein O is less than 0.5, $\Delta$ is not less than 0.5 and less than 3, and X is not less than 3.

Water resistance—This property was determined by subjecting a test piece to the test, Class 1, for separation on immersion specified in JAS on special plywood and rating the results on the two-point scale, wherein O is passage of the standard and X is failure to pass the standard.

Stain resistance (J)—This property was determined by subjecting a test piece to a test for stain resistance and rating the results on the three-point scale, wherein O is absence of change, $\Delta$ is presence of contamination which could be easily removed with solvent or dry cloth or which showed a slight sign of change after treatment with solvent or dry cloth, and X is presence of heavy contamination.

Crack resistance—This property was determined by subjecting a test piece to a cold-hot repeating test, A, specified in JAS on special plywood and taking count of the number of cycles of cold-hot treatment until the test piece sustained a crack or bulge.

Chemical resistance—This property was determined by subjecting a test piece to a test for resistance to alkalis and a test for resistance to acids in accordance with the procedure specified in JAS on special plywood and rating the results on the two-point scale, wherein O is absence of change and X is presence of change.

EXAMPLE 24

In the resin composition solution (I), a white plain TiO$_2$-filled paper possessing a thickness of 0.12 mm and a weight of 100 g/m$^2$ was immersed. The resultant impregnated TiO$_2$-filled paper was dried in draft at room temperature. The TiO$_2$-filled paper was then dried with hot air at 100° C. for a varying time indicated in Table 7. The TiO$_2$-filled paper and one veneer plywood possessing a thickness of 4 mm were superposed and thermally cured with a mirror plate of stainless steel for 10 minutes at 150° C. under a pressure of 15 kg/cm$^2$, to find the relation between the drying time and the degree of curing obtained in the produced decorative overlaid plywood. The results are shown in Table 7.

It is noted from this table that beautiful decorative overlaid plywoods possessing high gloss and reflecting proper degrees of curing were obtained in wide ranges of drying time.

Figure 2:
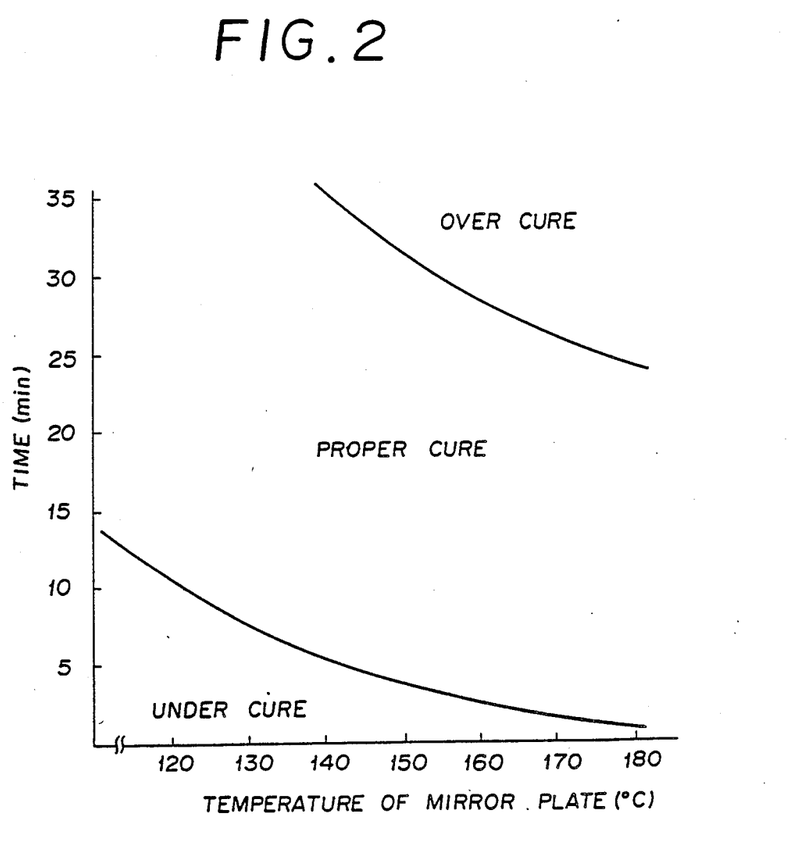
FIG. 2 is a graph showing the optimum curing region expressed with the relation between the mirror plate temperature and the heating time obtained of a typical decorative overlaid plywood embodying the present invention.

Separately, the same TiO$_2$-filled paper impregnated and dried in draft in the same manner as described above was dried with hot air at 100° C. for 20 minutes. This TiO$_2$-filled paper and one veneer plywood possessing a thickness of 4 mm were superposed and thermally cured with mirror plate under a pressure of 15 kg/cm$^2$ at a varying temperature for a varying time both indicated in FIG. 2, to find the relation between the curing temperature and time and the degree of curing obtained in the produced decorative overlaid plywood. The results are shown in FIG. 2. It is noted from FIG. 2 that beautiful decorative overlaid plywoods possessing high gloss and reflecting proper degrees of curing were obtained in wide ranges of mirror plate temperature and curing times.

The degree of curing was determined by subjecting a given decorative overlaid plywood to the test, Class 1 for separation on immersion specified in JAS on special plywood. A test piece showing proper cure was rated as passable and a test piece showing under cure or over cure as rejectable.

TABLE 7

| Drying time (min.) | 5 | 10 | 15 | 20 | 25 | 30 |
|---|---|---|---|---|---|---|
| Degree of curing (Example 24) | O | O | O | O | O | O |

The degree of curing was determined by subjecting a decorative overlaid plywood to the test, Class 1, for separation on immersion specified by JAS on special plywood and a test for stain resistance specified in JIS K 6902 (1977). The results were rated on the two-point scale, wherein O is passage of both the standards and X is failure to pass either or both of standards.

Standard for passage:
Separation on immersion—The same as the standard specified in JAS on special plywood
Stain resistance—Absence of change
What is claimed is:

1. A thermosetting resin decorative laminated sheet faced with a resin-impregnated sheet layer obtained by impregnating a sheetlike material with a resin composition containing an amino resin (I) produced by the reaction of formaldehyde with an amino compound (A) containing as an essential component thereof at least one carboguanamine (a) represented by the formula I:

one carboguananmine (a) represented by the formula I:

wherein X is CH$_2$ and n is 0 or 1, and curing the impregnated sheetlike material, said amino resin (I) having a degree of methanol miscibility, $M_1$, in the range of 1 to 200, and a degree of methanol miscibility, $M_2$, in the range of 90 to 200.

2. A decorative laminated sheet according to claim 1, wherein said sheetlike material is selected from the group consisting of paper, cloth, and veneer.

3. A decorative laminated sheet according to claim 1, wherein said amino resin (I) is soluble in organic solvents.

4. A decorative laminated sheet according to claim 3, wherein the carboguanamine (a) content in said amino compound (A) is in the range of 60 to 100% by weight.

5. A decorative laminated sheet according to claim 4, wherein said carboguanamine (a) content in said amino compound (A) is in the range of 95 to 100% by weight.

6. A decorative laminated sheet according to claim 3, wherein said resin composition further contains at least one resin selected from the group consisting of unsaturated polyester resin and alkyd resin.

7. A decorative laminated sheet according to claim 6, wherein at least one resin selected from the group consisting of unsaturated polyester resin and alkyd resin is contained in a ratio in the range of 10 to 150 parts by weight, based on 100 parts by weight of said amino resin (I).

8. A decorative laminated sheet according to claim 1, wherein said amino resin (I) is soluble in water.

9. A decorative laminated sheet according to claim 8, wherein said amino compound (A) contains 80 to 20% by weight of melamine.

10. A decorative laminated sheet according to claim 9, wherein said amino compound (A) contains 40 to 20% by weight of melamine.

11. A decorative laminated sheet according to claim 1, wherein said formaldehyde is used in a ratio in the range of 1.2 to 10 mols, based on 1 mol of said amino compound (A).

12. A decorative overlaid plywood having integrated with a substrate a resin-impregnated sheet layer obtained by impregnating a sheetlike material with a resin composition containing an amino resin (I) produced by the reaction of formaldehyde with an amino compound (A) containing as an essential component thereof at least one carboguananmine (a) represented by the formula I:

wherein X is CH$_2$ and n is 0 or 1, and curing the impregnated sheetlike material said amino resin I having a degree of methanol miscibility, $M_1$, in the range of 1 to 200 and a degree of methanol miscibility, $M_2$, in the range of 90 to 200.

13. A decorative overlaid plywood according to claim 12, wherein said sheetlike material selected from the group consisting of paper, cloth, and venner.

14. A decorative overlaid plywood according to claim 12, wherein said amino resin (I) is soluble in organic solvents.

15. A decorative overlaid plywood according to claim 14, wherein the carboguanamine (a) content in said amino compound (A) is in the range of 60 to 100% by weight.

16. A decorative overlaid plywood according to claim 15, wherein said carboguanamine (a) content in said amino compound (A) is in the range of 95 to 100% by weight.

17. A decorative overlaid plywood according to claim 14, wherein said resin composition further contains at least one resin selected from the group consisting of unsaturated polyester resin and alkyd resin.

18. A decorative overlaid plywood according to claim 17, wherein at least one resin selected from the group consisting of unsaturated polyester resin and alkyd resin is contained in a ratio in the range of 10 to 150 parts by weight, based on 100 parts by weight of said amino resin (I).

19. A decorative overlaid plywood according to claim 12, wherein said amino resin (I) is soluble in water.

20. A decorative overlaid plywood according to claim 19, wherein said amino compound (A) contains 80 to 20% by weight of melamine.

21. A decorative overlaid plywood according to claim 20, wherein said amino compound (A) contains 40 to 20% by weight of melamine.

22. A decorative overlaid plywood according to claim 12, wherein said formaldehyde is used in a ratio in the range of 1.2 to 10 mols, based on 1 mol of said amino compound (A).

* * * * *